(12) United States Patent
Topham

(10) Patent No.: US 7,124,279 B2
(45) Date of Patent: Oct. 17, 2006

(54) PROCESSOR AND METHOD FOR GENERATING AND STORING COMPRESSED INSTRUCTIONS IN A PROGRAM MEMORY AND DECOMPRESSED INSTRUCTIONS IN AN INSTRUCTION CACHE WHEREIN THE DECOMPRESSED INSTRUCTIONS ARE ASSIGNED IMAGINARY ADDRESSES DERIVED FROM INFORMATION STORED IN THE PROGRAM MEMORY WITH THE COMPRESSED INSTRUCTIONS

(75) Inventor: Nigel Peter Topham, Wokingham (GB)

(73) Assignee: PTS Corporation, San Jose, CA (US)

( * ) Notice: Subject to any disclaimer, the term of this patent is extended or adjusted under 35 U.S.C. 154(b) by 570 days.

(21) Appl. No.: 09/862,654

(22) Filed: May 22, 2001

(65) Prior Publication Data

US 2001/0047466 A1    Nov. 29, 2001

(30) Foreign Application Priority Data

May 25, 2000   (GB)   .................. 0012839.7

(51) Int. Cl.
*G06F 15/76* (2006.01)
(52) U.S. Cl. ...................................... 712/24
(58) Field of Classification Search .................. 712/24; 711/3
See application file for complete search history.

(56) References Cited

U.S. PATENT DOCUMENTS

| | | | |
|---|---|---|---|
| 5,057,837 A * | 10/1991 | Colwell et al. ................ | 341/55 |
| 5,509,129 A * | 4/1996 | Guttag et al. ................ | 712/203 |
| 5,799,138 A * | 8/1998 | Yoshida ...................... | 358/1.15 |
| 5,864,859 A * | 1/1999 | Franaszek ................... | 707/101 |
| 5,870,576 A * | 2/1999 | Faraboschi et al. ......... | 712/210 |
| 5,878,267 A | 3/1999 | Hampapuram et al. | |
| 5,893,143 A * | 4/1999 | Tanaka et al. .............. | 711/120 |
| 5,983,336 A | 11/1999 | Sakhin et al. | |

(Continued)

FOREIGN PATENT DOCUMENTS

EP    0 994 413    4/2000

(Continued)

OTHER PUBLICATIONS

Conte, T.M. et al., "Instruction fetch mechanisms for VLIW architectures with compressed encodings", Microarchitecture, 1996. MICRO-29. Proceedings of the 29th Annual IEEE/ACM International Symposium on, Dec. 2, 1996, pp. 201-211.*

(Continued)

*Primary Examiner*—Eddie Chan
*Assistant Examiner*—Aimee J Li
(74) *Attorney, Agent, or Firm*—Greer, Burns & Crain, Ltd.

(57) ABSTRACT

Instructions of a program are stored in compressed form in a program memory. A cache loading unit includes a decompression section and performs a cache loading operation in which one or more compressed-form instructions are read from the position in the program memory identified by the program counter and are decompressed and stored in one of the said cache blocks of the instruction cache. When a cache miss occurs because the instruction to be fetched is not present in the instruction cache, a cache loading unit performs such a cache loading operation. An updating unit updates the program counter and cache pointer in response to the fetching of instructions so as to ensure that the position identified by the said program counter is maintained consistently at the position in the program memory at which the instruction to be fetched from the instruction cache is stored in compressed form.

24 Claims, 13 Drawing Sheets

U.S. PATENT DOCUMENTS

| | | | |
|---|---|---|---|
| 6,195,107 B1* | 2/2001 | Iverson | 711/203 |
| 6,199,126 B1* | 3/2001 | Auerbach et al. | 710/68 |
| 6,343,354 B1* | 1/2002 | Breternitz et al. | 711/201 |
| 6,349,372 B1* | 2/2002 | Benveniste et al. | 711/159 |
| 6,581,131 B1* | 6/2003 | Vondran, Jr. | 711/3 |
| 6,658,548 B1* | 12/2003 | Kochar et al. | 711/202 |

FOREIGN PATENT DOCUMENTS

| | | |
|---|---|---|
| GB | 2 284 492 | 6/1995 |
| GB | 2 349 252 | 10/2000 |

OTHER PUBLICATIONS

Larin, S.Y.; Conte, T.M., "Compiler-driven cached code compression schemes for embedded ILP processors", Microarchitecture, 1999. MICRO-32. Proceedings. 32nd Annual International Symposium on, Nov. 16, 1999, pp. 82-92.*

A. Tannenbaum, "Structured Computer Organization," Prentice-Hall, 1984, pp. 10-12.*

* cited by examiner

|   | instruction 1 | instruction 2 |   |
|---|---|---|---|
| 0 | add | nop | ←P0 |
| 2 | nop | mpy | ←P1 |
| 4 | nop | load | ←P2 |

*Fig.1(A)* before compaction

| 0 | add |
|---|---|
| 1 | nop |
| 2 | nop |
| 3 | mpy |
| 4 | nop |
| 5 | load |

*Fig.1(B)* after compaction

| 0 | 100101 | key |
|---|---|---|
| 1 | add | |
| 2 | mpy | |
| 3 | load | |

*Fig.1(C)*

| | | | | |
|---|---|---|---|---|
| - | I1 | I2 | - | 1000 |
| loop 8, r1 | - | - | - | 1010 |
| loop: I3 | I4 | - | - | 1020 |
| - | I5 | - | I6 | 1030 |
| - | I7 | - | - | 1040 |
| I8 | I9 | - | - | 1050 |
| - | I10 | - | I11 | 1060 |
| - | - | - | I12 | 1070 |
| - | I13 | I14 | - | 1080 |
| I15 | - | I16 | - | 1090 |
| - | I17 | - | I18 | 10a0 |
| I19 | - | - | I20 | 10b0 |

Fig.10

| | | |
|---|---|---|
| VCS1 | 1000 | 2000 |
| | key1 | 2004 |
| | I1 | 2008 |
| | I2 | 200c |
| | loop 8, r1 | 2010 |
| | I3 | 2014 |
| | I4 | 2018 |
| | I5 | 201c |
| | I6 | 2020 |
| VCS2 | 1040 | 2024 |
| | key2 | 2028 |
| | I7 | 202c |
| | I8 | 2030 |
| | I9 | 2034 |
| | I10 | 2038 |
| | I11 | 203c |
| | I12 | 2040 |
| VCS3 | 1080 | 2044 |
| | key3 | 2048 |
| | I13 | 204c |
| | I14 | 2050 |
| | I15 | 2054 |
| | I16 | 2058 |
| | I17 | 205c |
| | I18 | 2060 |
| | I19 | 2064 |
| | I20 | 2068 |

Fig.11

PROCESSOR AND METHOD FOR GENERATING AND STORING COMPRESSED INSTRUCTIONS IN A PROGRAM MEMORY AND DECOMPRESSED INSTRUCTIONS IN AN INSTRUCTION CACHE WHEREIN THE DECOMPRESSED INSTRUCTIONS ARE ASSIGNED IMAGINARY ADDRESSES DERIVED FROM INFORMATION STORED IN THE PROGRAM MEMORY WITH THE COMPRESSED INSTRUCTIONS

BACKGROUND OF THE INVENTION

1. Field of the Invention

The present invention relates to processors having compressed instructions. In particular, but not exclusively, the present invention relates to very long instruction word (VLIW) processors having compressed instructions. The present invention also relates to methods of compressing instructions for processors.

2. Description of the Prior Art

A VLIW instruction schedule (program) may contain a significant number of "no operation" (NOP) instructions which are there simply to pad out empty slots in the overall instruction schedule. As it is wasteful to store such NOPs explicitly in a schedule or program memory used for storing the instruction schedule, it is desirable to provide a mechanism for storing the VLIW instructions in the schedule memory in a compressed form.

FIG. 1(A) of the accompanying drawings shows an example original (non-compressed) VLIW instruction schedule made up of three VLIW packets P0, P1 and P2. Each packet is made up of two instructions. In this example, therefore, the processor which is to execute the instruction schedule must have first and second execution units, the first instruction of each packet (instruction 1) being executed by the first execution unit in parallel with the execution of the second instruction (instruction 2) of that packet by the second execution unit.

In the FIG. 1(A) example, half of the slots in the schedule contain NOP instructions (slots 1, 2 and 4).

FIG. 1(B) shows how the instruction schedule of FIG. 1(A) would be stored in its original non-compressed form in the schedule memory. In FIG. 1(B) the instructions appear as a sequential scan from left to right and from top to bottom of the VLIW instruction schedule of FIG. 1(A).

FIG. 1(C) shows how the FIG. 1(A) schedule can be stored in the schedule memory in compressed (or compacted) form. The first word of the compressed schedule contains a bit vector, referred to hereinafter as a "decompression key". The decompression key has a plurality of bits corresponding respectively to the instructions in the non-compressed schedule (FIG. 1(B)). If a particular bit in the key is a 0 this denotes that the instruction corresponding to that bit is a NOP instruction. If the bit is a 1 its corresponding instruction is a useful (non-NOP) instruction. In this way, all NOP instructions can be eliminated in the compressed version of the schedule.

Such a compression mechanism is highly valuable in an embedded processing environment (in which the processor is embedded in a system such as in a mobile communication device) where high code or instruction density is of critical importance because of the limited resources of the system, for example in terms of available program memory. However, such compression complicates the task of executing instructions in parallel. For example, when a VLIW instruction schedule contains two instructions which could in principle be executed in parallel but which are separated by a number of NOP instructions, the processor would have to search linearly through the compressed version of the schedule to identify instructions that could be executed in parallel. Most importantly, after compression, concurrency between one instruction and other instructions can no longer be determined simply by observing the position of that one instruction relative to those other instructions as they are stored in the schedule memory. In general, one of the primary advantages of VLIW processing (over more complex schemes for issuing instructions in parallel such as superscalar processing) is that in a (non-compressed) VLIW instruction schedule it is possible to determine when instructions are independent of one another (and hence can be executed concurrently) by observing the relative positions of instructions in the schedule. Accordingly, it is desirable to facilitate determination of independence even in a situation in which the instruction schedule is stored in the schedule memory in compressed form.

When a VLIW instruction schedule is stored in compressed form in the schedule memory the compressed packets must of course be decompressed before they can be supplied to the execution units for execution of the instructions contained therein. The decompression is desirably performed "on the-fly", i.e. during actual execution of the instruction schedule. To make such on-the-fly decompression possible, the decompression must be performed with low computational complexity and involve a comparatively simple hardware implementation so that the cost, in terms of lost execution time, arising from the decompression process is small.

BRIEF SUMMARY OF THE INVENTION

A processor embodying a first aspect of the present invention executes instructions of a program stored in compressed form in a program memory. The processor has a program counter which identifies a position in the program memory. An instruction cache has a plurality of cache blocks, each for storing one or more instructions of the program in decompressed form. A cache loading unit has a decompression section and performs a cache loading operation in which one or more compressed-form instructions are read from the position in the program memory identified by the program counter and are decompressed and stored in one of the cache blocks of the instruction cache. A cache pointer identifies a position in the instruction cache of an instruction to be fetched for execution. An instruction fetching unit fetches an instruction to be executed from the position identified by the cache pointer. When a cache miss occurs because the instruction to be fetched is not present in the instruction cache, the instruction fetching unit causes the cache loading unit to perform its cache loading operation. An updating unit updates the program counter and cache pointer in response to the fetching of instructions so as to ensure that the position identified by the program counter is maintained consistently at the position in the program memory at which the instruction to be fetched from the instruction cache is stored in compressed form.

A second aspect of the present invention provides a method of compressing a program to be executed by a processor in which compressed-form instructions stored in a program memory are decompressed and cached in an instruction cache prior to being issued. In the method a sequence of original instructions of the program is converted into a corresponding sequence of such compressed-form instructions. Original instructions are assigned imaginary addresses according to the sequence thereof. The assigned imaginary addresses are imaginary addresses at which the instructions are to be considered to exist when held in decompressed form in the instruction cache of the processor. The compressed-form instructions are stored in the program memory together with imaginary address information specifying the assigned imaginary addresses so that, when the compressed-form instructions are decompressed and loaded by the processor into the instruction cache, the processor can assign the specified imaginary addresses to the decompressed instructions.

A third aspect of the present invention provides a computer-readable recording medium storing a computer program which, when run on a computer, causes the computer to carry out a method of compressing a processor program to be executed by a processor. The processor has the facility to decompress compressed-form instructions stored in a program memory and to cache the decompressed instructions in an instruction cache prior to issuing them. The computer program has a converting portion which converts a sequence of original instructions of the processor program into a corresponding sequence of such compressed-form instructions. An assigning portion assigns such original instructions imaginary addresses according to the sequence thereof, the assigned imaginary addresses being imaginary address at which the instructions are to be considered to exist when held in decompressed form in the instruction cache of the processors. A storing portion stores, in the program memory, the compressed-form instructions together with imaginary address information specifying the assigned imaginary addresses so that, when the compressed-form instructions are decompressed and loaded by the processor into the instruction cache, the processor can assign the specified imaginary addresses to the decompressed instructions.

BRIEF DESCRIPTION OF THE DRAWINGS

FIGS. 1(A), 1(B) and 1(C) show explanatory diagrams for illustrating compression of a VLIW instruction schedule;

FIG. 10 shows a VLIW instruction schedule prior to compression in a worked example for illustrating operation of the FIG. 8 embodiment;

FIG. 11 is a diagram showing how the VLIW instruction schedule of FIG. 10 is stored in compressed form in a schedule memory.

DETAILED DESCRIPTION OF THE PREFERRED EMBODIMENTS

Figure 2:
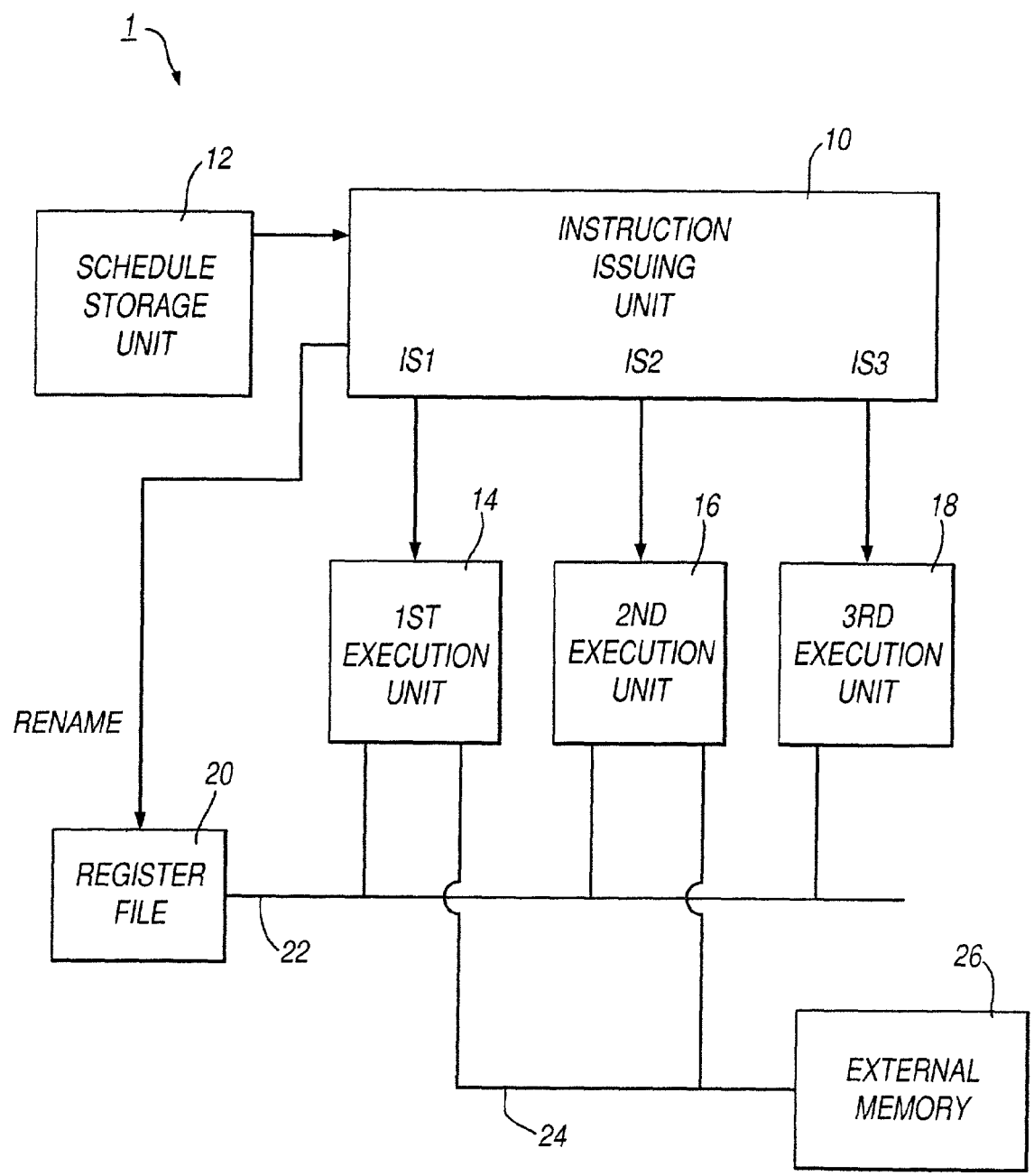
FIG. 2 shows parts of a processor embodying the present invention.

FIG. 2 shows parts of a processor embodying the present invention. In this example, the processor is a very long instruction word (VLIW) processor. The processor 1 includes an instruction issuing unit 10, a schedule storage unit 12, respective first, second and third execution units 14, 16 and 18, and a register file 20. The instruction issuing unit 10 has three issue slots IS1, IS2 and IS3 connected respectively to the first, second and third execution units 14, 16 and 18. A first bus 22 connects all three execution units 14, 16 and 18 to the register file 20. A second bus 24 connects the first and second units 14 and 16 (but not the third execution unit 18 in this embodiment) to a memory 26 which, in this example, is an external random access memory (RAM) device. The memory 26 could alternatively be a RAM internal to the processor 1.

Incidentally, although FIG. 1 shows shared buses 22 and 24 connecting the execution units to the register file 20 and memory 26, it will be appreciated that alternatively each execution unit could have its own independent connection to the register file and memory.

The processor 1 performs a series of processing cycles. In each processing cycle the instruction issuing unit 10 can issue one instruction at each of the issue slots IS1 to IS3. The instructions are issued according to a VLIW instruction schedule (described below) stored in the schedule storage unit 12.

The instructions issued by the instructing issuing unit 10 at the different issue slots are executed by the corresponding execution units 14, 16 and 18. In this embodiment each of the execution units can execute more than one instruction at the same time, so that execution of a new instruction can be initiated prior to completion of execution of a previous instruction issued to the execution unit concerned.

To execute instructions, each execution unit 14, 16 and 18 has access to the register file 20 via the first bus 22. Values held in registers contained in the register file 20 can therefore be read and written by the execution units 14, 16 and 18. Also, the first and second execution units 14 and 16 have access via the second bus 24 to the external memory 26 so as to enable values stored in memory locations of the external memory 26 to be read and written as well. The third execution unit 18 does not have access to the external memory 26 and so can only manipulate values contained in the register file 20 in this embodiment.

Figure 3:
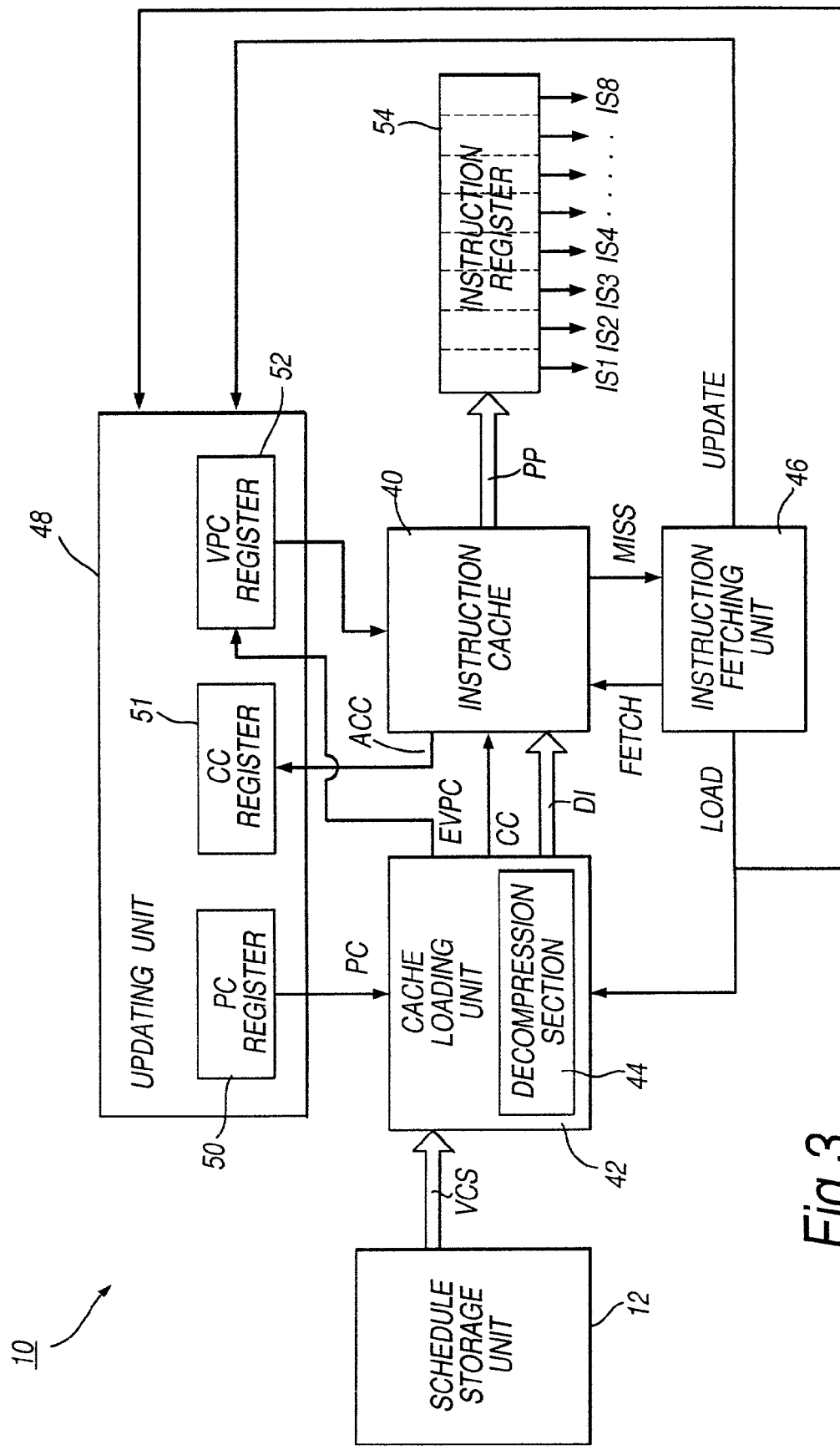
FIG. 3 shows parts of an instruction issuing unit in a first embodiment of the present invention.

FIG. 3 is a block diagram showing parts of the instruction issuing unit 10 of the FIG. 2 processor in a first embodiment of the present invention.

In this embodiment, the instruction issuing unit 10 includes an instruction cache 40, a cache loading unit 42 having a decompression section 44, an instruction fetching unit 46, an updating unit 48 and an instruction register 54. The updating unit 48 includes three registers in this embodiment: a program counter register (PC register) 50, a compressed instruction counter register (CC register) 51 and a cache pointer register (VPC register) 52.

The cache loading unit 42 is connected to the schedule storage unit 12 for receiving therefrom compressed-form VLIW instructions VCS. The cache loading unit 42 is also connected to the instruction fetching unit 46 for receiving therefrom a control signal LOAD, and is also connected to the PC register 50 for receiving the PC value held therein.

The instruction cache 40 is connected to the cache loading unit 42 for receiving therefrom decompressed instructions DI, as well as a compressed instruction count value (CC) associated with the decompressed instructions DI. The instruction cache 40 is also connected to the instruction fetching unit 46 for receiving therefrom a control signal FETCH and for outputting thereto a control signal MISS. The instruction cache 40 is further connected to the VPC register 52 in the updating unit 48 for receiving therefrom the VPC value held therein.

The instruction register 54 is connected to the instruction cache 40 for receiving therefrom a selected processor packet PP. The instruction register 54 in this embodiment has a width of eight instructions, providing eight issue slots IS1 to IS8. Each issue slot is connected to an individually-corresponding execution unit (not shown).

The instruction fetching unit 46 is connected to the updating unit 48 for applying thereto a control signal UPDATE, as well as the above-mentioned LOAD signal.

The VPC register 52 is the updating unit 48 is also connected to the cache loading unit for receiving therefrom an extracted VPC value EVPC associated with the decompressed instructions DI. The CC register 51 in the updating unit 48 is connected to the instruction cache 40 for receiving therefrom an accessed cache block instruction count vale ACC.

Operation of the units shown in FIG. 3 will now be described with reference to FIGS. 4 to 7.

The FIG. 2 processor may operate selectively in two modes: a scalar mode and a VLIW mode. In scalar mode the processor executes instructions from a particular instruction set (which may or may not be distinct from the VLIW instruction set) but does not attempt to issue instructions in parallel at the issue slots IS1 to IS8. In VLIW mode, on the other hand, up to 8 instructions are issuable in parallel per instruction cycle at the 8 issue slots IS1 to IS8, i.e. the full instruction issue width is exploited.

Scalar-mode instructions and VLIW-mode instructions are both stored together in the schedule storage unit 12, with the VLIW instructions being stored in a predetermined compressed form. The program counter (PC) value held in the PC register 50 is used to identify the position reached in the stored sequence of instructions in the schedule storage unit 12, both in the scalar mode and in the VLIW mode. Operation in the scalar mode will not be considered in further detail herein.

Figure 4:
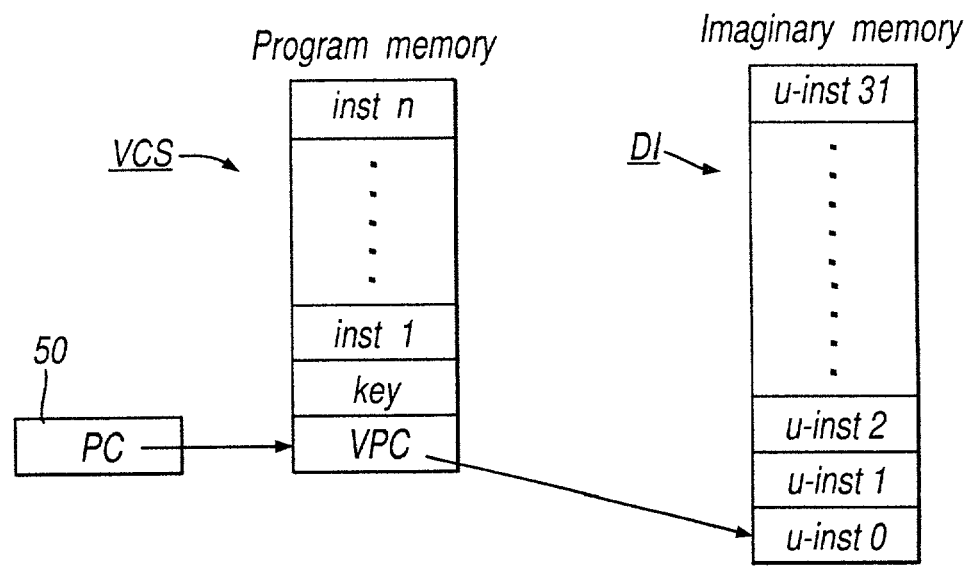
FIG. 4 is an explanatory diagram for illustrating compression of a VLIW instruction schedule in the FIG. 3 embodiment.

FIG. 4 shows a section VCS of VLIW instructions stored in compressed form in the schedule storage unit 12. This compressed form is essentially the same as that described hereinbefore with reference to FIGS. 1(A) to 1(C), except that in the FIG. 4 section VCS the first word of the section VCS is used for storing an imaginary address value (VPC value), as will be explained in more detail hereinafter. The second word of the section VCS is used for storing the decompression key KEY needed for decompressing the instructions contained in the section VCS. The remaining words of the section VCS are used for storing any non-NOP instructions belonging to the section concerned. No NOP instructions are therefore stored explicitly in the section VCS.

When the processor attempts to execute the section VCS of compressed VLIW instructions the PC register 50 will initially point to the start of the section. In order to determine which instructions in the section VCS belong to the same processor packet (i.e. are instructions which must be issued simultaneously at the issue slots IS1 to IS8), and in which positions within that packet, the compressed section VCS must be decompressed. In the instruction issuing unit 10 of FIG. 3, the section VCS is decompressed by the decompression section 44 and the resulting decompressed block of instructions DI is stored in the instruction cache 40. The clock of decompressed instructions DI corresponding to the VLIW compression section VCS is therefore not actually stored in the schedule storage unit 12 even at execution time, and at execution time the decompressed instructions DI exist only in the instruction cache 40 in an "imaginary address space".

The mapping from the program address of the start of a compressed VLIW section VCS to its imaginary address is created by an assembler/linker used to assemble/link the processor's program. The mapping information in the present embodiment is the VPC value shown in FIG. 4, stored in the first word of the compressed section VCS. Thus, as shown in FIG. 4, the PC register 50 points to the start of the compressed VLIW section VCS in the schedule storage unit (normal program memory) 12. The VPC value held in the first word of the section VCS is a pointer to the start of the decompressed block of instructions DI in imaginary memory (i.e. an entry point into the decompressed block DI).

In the present embodiment, as FIG. 4 shows, the decompressed block DI is made up of 32 words. This requires a 32-bit decompression key KEY. In a 32-bit processor, this means that the decompression key KEY occupies only one word in the compressed section VCS, corresponding to a space overhead for compression of 6.25% of the decompressed block size. When instruction schedules are dense (i.e. there are few NOPs) the overhead on the compressed code will approach 6.25%, which is an acceptable overhead. When schedules are sparse, however, the overhead on compressed code will be high in relation to the total amount of code, but the net saving in memory will be significant. If v is the fraction of instructions in a schedule that are not NOPs (i.e. v represents the code density) then the size $S_{VCS}$ of a compressed section VCS will be $S_{VCS}=2+32$ v words, and a net space saving will be achieved when v<93.8%, i.e. when any two or more instructions in a block of up to 32 instructions are NOPs.

Figure 5:
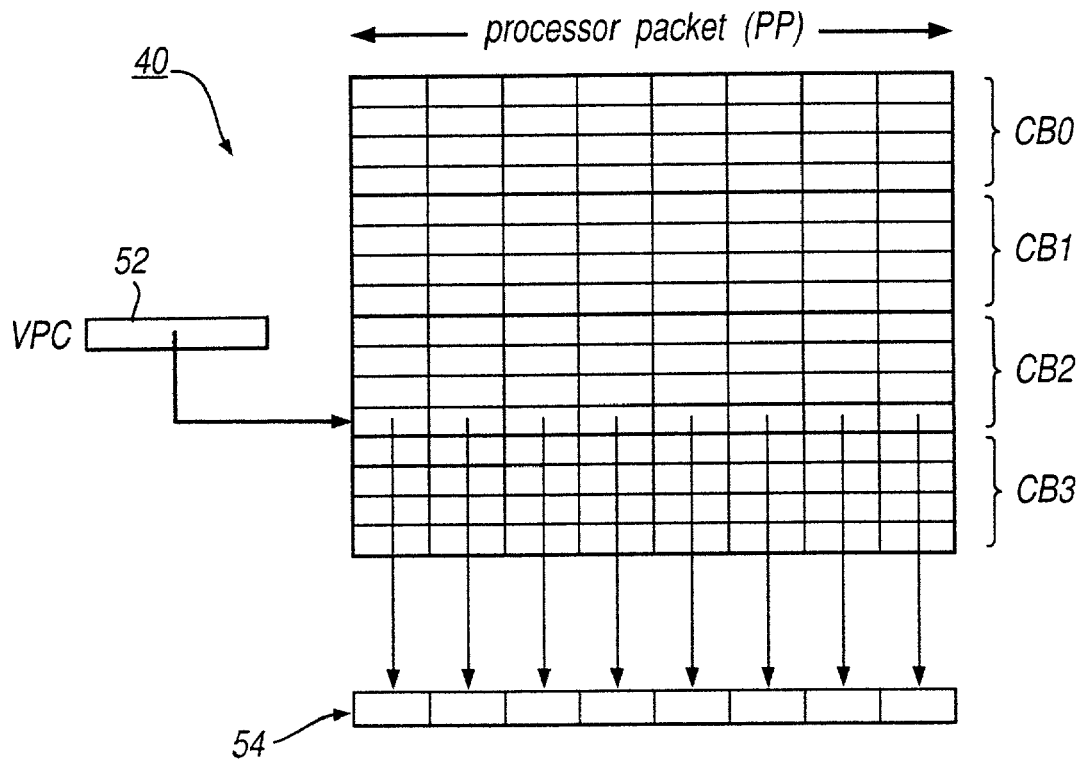
FIG. 5 is a diagram showing the internal organisation of parts of an instruction cache in FIG. 3.

FIG. 5 shows the internal organisation of the instruction cache 40 in this embodiment in more detail. As shown in FIG. 5 the instruction cache 40 is organised in rows and columns, with each row representing an individual processor packet PP and each column representing the instructions within a processor packet. The instruction cache 40 is also sub-divided into a plurality (4 in this example) of cache blocks (CB0 to CB3). In this example, each cache block is made up of 32 words. As there are eight instructions in each processor packet, each cache block within the instruction cache 40 contains four processor packets.

The VPC value currently held in the VPC register 52 is used to identify the current processor packet being issued, i.e. loaded into the instruction register 54.

Figure 6:
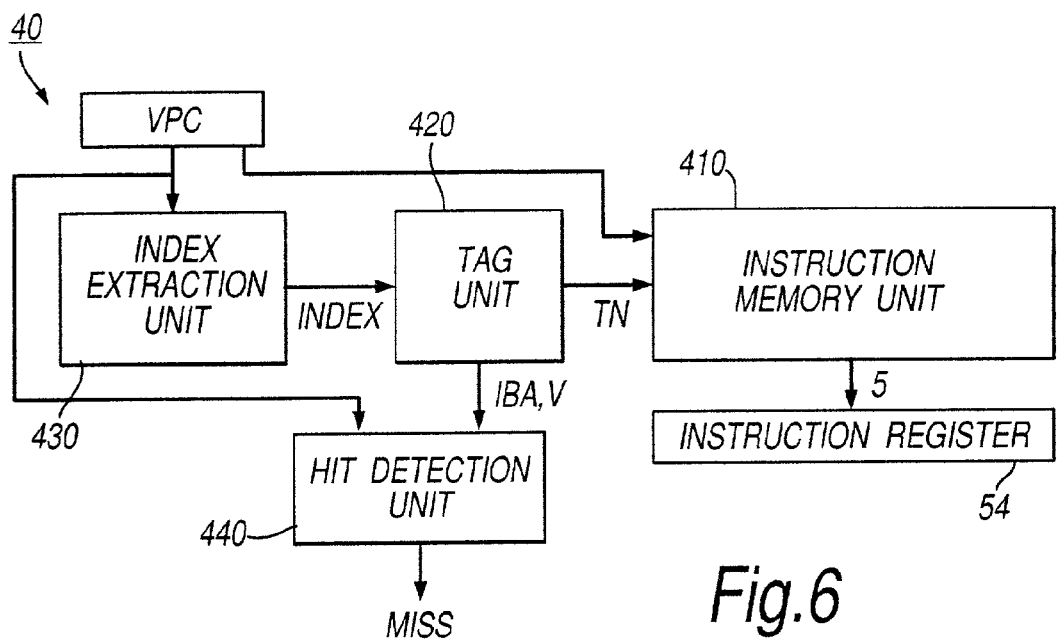
FIG. 6 shows parts of the FIG. 3 instruction cache in more detail.
Figure 7:
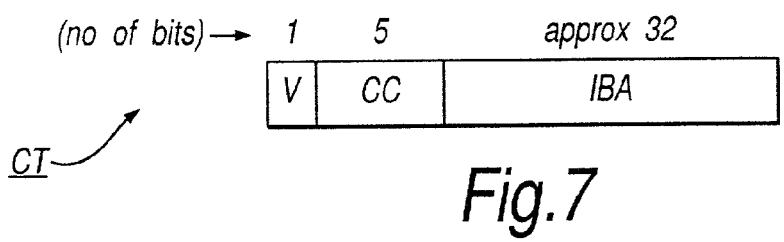
FIG. 7 is a diagram showing an example format of a cache tag in the FIG. 3 instruction cache.

FIG. 6 shows the structure of the instruction cache 40 in this embodiment in more detail. The instruction cache 40 comprises an instruction memory unit 410, a tag unit 420, an index extraction unit 430, and a cache hit detection unit 440. The instruction memory unit 410 is used for storing the decompressed instructions and is organised into cache blocks as described already with reference to FIG. 5. Each cache block in the instruction memory unit 410 has an individually-associated cache tag CT held in the tag unit 420. An example of the format of each cache tag CT is shown in FIG. 7. In this example, the cache tag CT has three fields. The first field (V-field) is a single-bit field used to indicate the validity of the tag. When V=0 this indicates that the associated cache block does not contain valid data (instructions). When V=1 this indicates that the associated cache block does contain valid instructions.

The second field (CC) field of the cache tag CT is a five-bit field for storing a compressed instruction count value (CC) representing the number of non-NOP instructions in the associated cache block. The purpose of this field will be explained in more detail later in the present specification.

The third field (IBA field) is used to store an imaginary block address (IBA) which effectively represents the address of the associated cache block in the imaginary address space described hereinbefore with reference to FIG. 4. The IBA field may be approximately 32 bits in length.

Referring back to FIG. 6, when a cache block of the instruction memory unit 410 is to be accessed, the block is identified using the imaginary address value (VPC value) supplied from the VPC register 52 (FIG. 5). In this embodiment, the cache 40 is a directly-mapped cache, and any particular address in the imaginary address space can only be mapped to a unique one of the cache blocks in the cache 40. The identification of the required cache block based on the received VPC value is performed as follows.

Firstly, the index extraction unit 430 extracts an index value INDEX from the received VPC value. This index value INDEX is made up of a preselected group of successive bits (bit field) from within the received VPC value. The number of bits in INDEX is i, where $2^i$ is the total number of cache blocks in the cache 40. The index value INDEX is used directly to address one cache tag CT from amongst the set of cache tags held in the tag unit 420.

The V and IBA fields of the addressed cache tag CT are output by the tag unit 420 to the cache hit detection unit 440.

When a match is found between the received VPC value and the IBA value held in the IBA field of the cache tag, and the V field indicates the associated cache block contains valid instructions (V=1), the cache detection unit 440 determines that a cache "hit" has occurred. In this case, the higher-order address bits needed to address the associated cache block within the instruction memory unit 410 are provided directly by the tag number TN of the matching cache tag. In this way, the cache block is identified. To select an individual processor packet from within the identified block, lower-order address bits are required. For example, if each block contains four processor packets (as in FIG. 5), two lower-order address bits are required. These lower-order address bits can be taken directly from the corresponding lower-order bits of the received VPC value.

If no cache tag having an IBA matching the received VPC value is present in the tag unit 420, or if there is such a matching tag but the V field of that tag is 0, the cache hit detection unit 440 produces the MISS control signal to indicate a cache "miss" has occurred.

Incidentally, it will be appreciated that, because the VPC value is only used to identify processor packets, as opposed to individual instructions or even bytes within the processor packet, the least significant z bits of the VPC value (and also of each IBA) are 0, where $2^z$ is the number of bytes in each processor packet. Accordingly, these least significant z bits are not implemented in the VPC register 52 or in the IBA field of each cache tag. Furthermore, as each IBA value is only used to identify an imaginary block address, i.e. the imaginary address of the start of a cache block in which decompressed instructions DI are present, a further y least-significant bits of each IBA are also 0, where y is the number of processor packets in each cache block. These further y bits are also not implemented in the IBA field of each cache tag.

Referring back to FIG. 3, when the FETCH control signal is applied to the instruction cache 40 by the instruction fetching unit 46, two outcomes are possible: a cache hit or a cache miss. In the event of a cache hit, the current processor packet identified by the VPC value held in the VPC register 52 is loaded directly into the instruction register 54, whereafter the UPDATE control signal is supplied by the instruction fetching unit 46 to the updating unit 48. In response to the UPDATE signal the VPC value held in the VPC register 52 is incremented to point to the next processor packet in the instruction cache. When a cache hit occurs in response to the FETCH signal, the value held in the CC field of the matching cache tag is loaded into the CC register 51, as well.

If a cache miss occurs in response to the FETCH signal, the cache hit detection unit 440 supplies the MISS signal to the instruction fetching unit 46. In this case, before the processor packet having the imaginary address specified by the current VPC value can be fetched into the instruction register 54, it is necessary for a cache loading operation to be performed to load a block of decompressed instructions, containing that processor packet, into an available one of the cache blocks of the instruction cache 40. Such a cache loading operation is initiated by the instruction fetching unit by applying the LOAD signal to the cache loading unit 42.

When a cache miss occurs, for reasons that will become apparent, the VPC value contained at the address in the schedule storage unit 12 pointed to by the PC value held in the PC register 50 will always match the current VPC value held in the VPC register 52. This means that loading of the required compressed-form VLIW code section VCS can be commenced immediately from that address.

Firstly, in the cache tag addressed by the INDEX value extracted by the index extraction unit 430 from the current VPC value, the V-field is set to 1 and the IBA field is loaded with the higher-order bits of the current VPC value held in the VPC register 52. In this way, the cache block associated with the addressed cache tag is reserved for storing the decompressed instructions corresponding to the compressed section VCS pointed to by the PC register.

Secondly, an internal count value CC of the decompressed section 44 is set to 0.

Next, the decompression key KEY of the compressed-form VLIW code section VCS pointed to by the PC register is read from the schedule storage unit 12 at the storage location PC+k, where k is the number of bytes in each word. The decompression key KEY is supplied to the decompression section 44.

The decompression section 44 examines each bit in turn of the decompression key KEY. If the bit is a 1, the cache loading unit 42 loads an instruction word of the compressed section VCS from the schedule storage unit 12 at the address given by PC+k(CC+1). The loaded instruction word is then stored in the reserved cache block at a position within the block corresponding to the examined bit. The internal count value CC is then incremented by 1.

If the examined bit is 0, on the other hand, the decompression section 44 outputs a NOP instruction word, which is stored in the identified cache block at a position in that block corresponding to the examined bit. The internal count value CC is not incremented in this case.

When all of the bits of the decompression key have been examined in this way, the internal count value CC finally reached is output by the cache loading unit 42 and stored in the CC field of the cache tag CT with which the reserved cache block is associated. This completes the cache loading operation.

After the cache loading operation is finished, the final step is to load the current processor packet PP from the newly-loaded cache block into the instruction register 54. The CC field of the cache tag associated with the newly-loaded cache block is output as the value ACC when that packet is loaded into the instruction register 54. This value ACC is stored in the CC register 51 of the updating unit.

It will be appreciated that in the FIG. 3 instruction issuing unit 10 the decompression of the VLIW code sections takes place "on-the-fly", that is, as the instructions are loaded into the cache. Such on-the-fly decompression is complicated by the fact that the capacity of the instruction cache 40 is limited and that it is not uncommon for the processor to have to switch process, for example in response to the receipt of an interrupt. As a consequence, it is quite possible that between the issuance of two successive processor packets belonging to the same cache block, the cache block concerned will have been evicted from the cache by another process bringing into the cache some of its own VLIW instructions. This means that in practice it is possible for any cache access to result in a miss. Accordingly, at any instruction cycle, the processor must be capable of reloading the cache with the (decompressed) instructions belonging to the missing cache block. This presents a real problem in that the VPC value (imaginary address of the decompressed instructions) held in the VPC register is of little use in locating the required compressed section VCS needed to obtain those decompressed instructions and there is no simple function that will translate from a VPC value to a PC value at which the VLIW packet pointed to by VPC is located in compressed form.

It is for this reason that in the FIG. 3 embodiment the PC and VPC values are always maintained consistent with one another by the updating unit 48. In this way it is guaranteed whenever a cache miss occurs PC will be pointing to the start of the compressed representation of the missing cache block pointed to by VPC. This consistency is ensured in the present embodiment by storing next-section locating information for use in locating the position in the program memory (i.e. a PC value) of the next compressed section following the compressed section whose corresponding cache block was accessed most recently to fetch an instruction.

In particular, the CC register 51 is updated, each time a cache block within the instruction cache 40 is accessed to fetch an instruction, with next-section locating information for use in locating the next compressed section after the compressed section corresponding to the accessed cache block. This next-section locating information in the present embodiment is the compressed instruction count value (CC value) for the compressed section corresponding to the most-recently-accessed cache block. This CC value represents the size of the compressed section corresponding to that most-recently-accessed cache block.

In the present embodiment, to enable the CC value for any valid cache block to be available immediately, the cache tag associated with each cache block holds in its CC field the CC value for the compressed section corresponding to the cache block concerned. The CC value to be stored in the CC field is generated by the decompression section 44 during the cache loading operation in which the compressed section is loaded into the cache. As the CC value for each valid cache block is generated at the time of cache loading and held in the CC field of the cache tag associated with that block, when any cache block is accessed to fetch an instruction, the CC value of that block's corresponding compressed section VCS can be obtained immediately by reading the CC field and storing the CC value in the CC register 51. In this way, the CC register 51 will always contain the CC value of the compressed section corresponding to the most-recently-accessed cache block. Thus, when a cache miss occurs, the position in the program memory of the next compressed section following that compressed section can be obtained simply by setting PC=PC+k(CC+2), where k is the number of bytes in each word. This makes reloading of any cache block possible at high speed when the block has been evicted between the fetching of a pair of successive packets belonging to that block.

It will be appreciated that the next-section locating information can take many other forms than a CC value. Each compressed section as stored could include the next-section locating information explicitly, for example a size value such as a CC value indicating the size of the section or even the direct address (PC value) of the start of the following compressed section. If the next-section locating information is held explicitly in the compressed section it is not necessary for the decompression section 44 to generate this information during the cache loading operation. However, in this case the compressed section will contain more words, reducing the memory savings available.

It is also not necessary to use the CC register 51 to hold the CC value of the compressed section corresponding to the most-recently-accessed cache block. As long as the most-recently-accessed cache block can always be identified in some way, the CC field of the cache tag associated with that block can be accessed "on demand" to provide the next-section locating information, although accessing the CC register will be faster.

Figure 8:
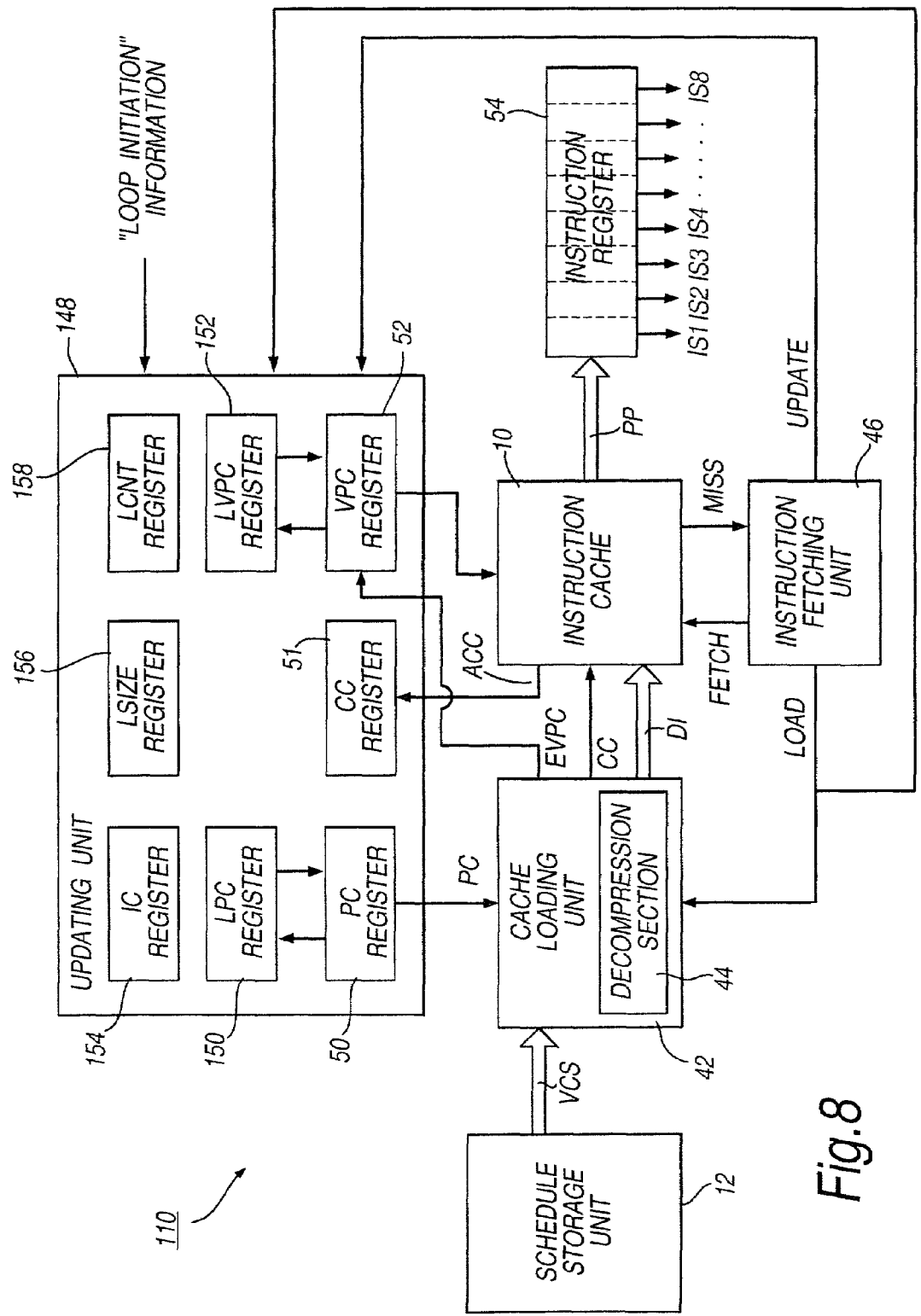
FIG. 8 shows parts of an instruction issuing unit in a second embodiment of the present invention.

FIG. 8 shows parts of an instruction issuing unit 110 according to a second embodiment of the present invention. The second embodiment is intended to enable on-the-fly decompression in a processor whose program is permitted to contain basic loops, as well as straight-line code, in the VLIW portions of the program. A basic loop is a loop in which there are no other jumps, branches or separate routine calls.

In the FIG. 8 embodiment the instruction issuing unit 110 is constituted in basically the same way as the instruction issuing unit 10 of the FIG. 3 embodiment and, in FIG. 8, elements of the instruction issuing unit 110 which are the same as, or correspond to, elements shown in FIG. 3 are denoted by the same reference numerals.

The FIG. 8 embodiment differs from the FIG. 3 embodiment in that the FIG. 8 embodiment has an updating unit 148 which, in addition to including the PC register 50, CC register 51 and VPC register 52, further includes five further registers 150 to 158. These five registers are loop control registers provided specifically to improve the performance of basic loops of VLIW instructions.

In a basic loop, in general (i.e. other than when a process switch or other exception occurs) the next block to be executed is either the next block beyond the current block or else it is a repetition of the first block of the loop. In the second embodiment, no other possibilities are permitted because of the extreme difficulty in executing an arbitrary relative jump within the imaginary address space provided by the instruction cache 40 as illustrated in FIG. 9.

Figure 9:
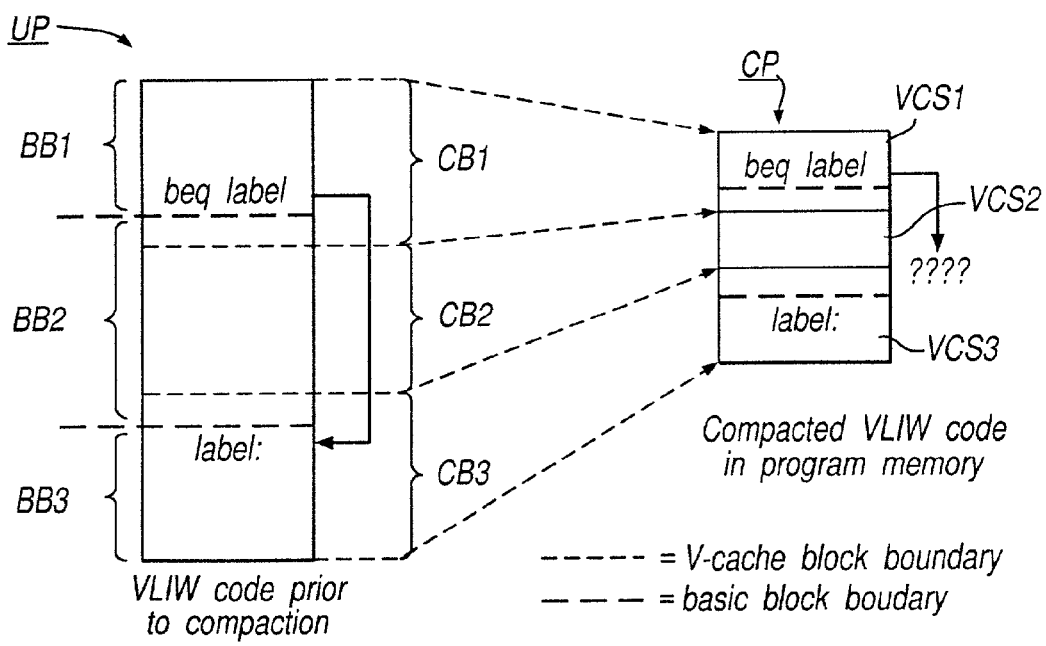
FIG. 9 is an explanatory diagram for illustrating a difficulty in branching in imaginary memory space.

In FIG. 9, the left portion of the diagram shows an original portion UP of VLIW instructions prior to compression. In this example the portion UP is made up of three basic blocks BB1 to BB3. A basic block is a sequence of instructions with a single entry point and a single exit point. An entry point is any instruction that is the target of a branch, jump or call instruction. An exit point is any branch, jump or call instruction, or any instruction that is followed by an entry point. Thus, in FIG. 9 the first basic block BB1 has an exit point where it has a "branch if equal" instruction "BEQ label". The second basic block BB2 commences with the first instruction after that branch instruction and ends at the instruction immediately prior to the target instruction "label:" of the BEQ instruction, i.e. the entry point of the third basic block BB3.

After compression the compressed version CP of the program portion UP concerned is shown on the right on FIG. 9. The compressed version CP occupies three compressed sections VCS1, VCS2 and VCS3. Each such compressed section VCS will occupy one cache block in the instruction cache 40 after decompression. However, the boundaries between those cache blocks do not correspond to the boundaries between the basic blocks BB1 to BB3, as illustrated in FIG. 9. In the compressed form in which each cache block is stored in the program memory (schedule storage unit) there is no linear relationship between the storage address of the compressed cache block and the original basic blocks of VLIW code. The branch instruction at the end of the basic block BB1 must therefore specify its target address in such a way that the basic block BB3 can be found and that the offset of the target instruction within that block can be determined. This is highly problematic. For example, if the branch offset were specified as an offset within the imaginary memory space a linear scan of the compressed version CP would be needed to find the compressed section VCS containing that imaginary target address. Conversely, if the branch target were specified as an offset within the (real) program memory space there would be no problem in identifying the first instruction at the target location, but the cache block in which that instruction occurs could not be identified. It might be considered in this situation that branch instructions should specify both the real and imaginary addresses of the target location but in practice the run-time overhead involved in such a scheme would render it impractical.

In view of the difficulties associated with arbitrary branching within imaginary address space the FIG. 8 embodiment is intended for use with a processor having a restricted programming model in which such arbitrary relative jumps are not permitted. Using such a restricted programming model, permitting only basic loops, there is still the problem of how to branch back to the beginning of the basic loop. This problem is solved in the FIG. 8 embodiment using the loop control registers 150 to 158. Specifically, these registers are a loop PC register (LPC register) 150, a loop VPC register (LVPC register) 152, an iteration counter register (IC register) 154, a loop size register (LSIZE register) 156, and a loop count register (LCNT register) 158.

Operation of the FIG. 8 embodiment is as follows. The LVPC register 152 is used to store the imaginary address of the first processor packet of a basic loop of VLIW instructions. The LPC register 150 is used to store the address (virtual address) in the schedule storage unit 12 of the compressed section VCS corresponding to the cache block pointed to by the LVPC register 152. The LPC and LVPC registers 150 and 152 are used together to refill the first cache block of a basic loop if it has been evicted from the instruction cache 40 between the initiations of any pair of successive iterations of the loop.

Upon entry into a basic loop, the current values of PC and VPC contained in the PC and VPC registers 50 and 52 are copied into the LPC and LVPC registers 150 and 152 respectively. The basic loop will be initiated by one or more predetermined instructions which will cause the IC register 154 to be loaded with the number of iterations of the loop to be performed. The loop-initiating instruction(s) will also cause LSIZE register 156 to be loaded with the number of processor packets contained in the loop body. A copy of the LSIZE value is also placed in the LCNT register 158.

During execution of the basic loop, when a processor packet is executed the LCNT register 158 is decremented by 1. When the LCNT value becomes 0 a new loop iteration is initiated.

When each new loop iteration is initiated the IC register 154 is decremented by 1. If it becomes 0 then all iterations of the loop have been completed. Otherwise, the LCNT register 158 is reloaded with the value held in the LSIZE register 156, the VPC register 52 is reloaded from the LVPC register 152, and the PC register 50 is reloaded from the LPC register 150.

When the basic loop completes, the VPC register 52 will be pointing to the first processor packet after the loop block. The processor status is then updated to reflect the fact that the processor is no longer executing a basic loop, after which normal VLIW processing continues from the next processor packet.

Next, operation of the second embodiment of the present invention will be illustrated with a worked example. In this worked example, a VLIW program portion to be executed is presented in FIG. 10 in its original form, i.e. prior to compression. It is assumed that the processor in this example is capable of issuing four instructions per instruction cycle. In FIG. 10 a "-"indicates a NOP instruction.

As shown in FIG. 10, the example program portion contains 20 useful (non-NOP) instructions I1 to I20, as well as a loop initiation instruction "loop 8, r1". The instructions are allocated addresses in an imaginary address space from 1000 to 10bf (expressed in hexadecimal notation). It will also be assumed, in this example, that each cache block in the instruction cache 40 is made up of 64 bytes, so that the imaginary address space from 1000 to 10bf is equivalent to three cache blocks located at 1000, 1040 and 1080 respectively.

The "loop 8 r1" instruction at imaginary address 1010 specifies that the following 8 processor packets at addresses 1020 to 1090 constitute a loop, and that the loop should be executed a number of times specified by the contents of a register r1. The loop in this example therefore spans all three cache blocks, but neither the start nor the end of the loop is aligned with a cache block boundary.

FIG. 11 shows how the program portion of FIG. 10 is stored in memory after compression. There are three compressed sections VCS1, VCS2 and VCS3. The compressed instructions occupy addresses (real addresses) in the schedule storage unit 12 from 2000 to 206b (again expressed in hexadecimal notation).

Each compressed section VCS has, in its first word, the imaginary address of the first instruction belonging to that section after decompression, i.e. the VPC value on entry to the decompressed cache block produced when the section is decompressed.

The second word of each compressed section VCS contains the decompression key needed to decompress the section concerned. The third and subsequent words of the section contain the non-NOP instructions belonging to the section.

Figure 12:
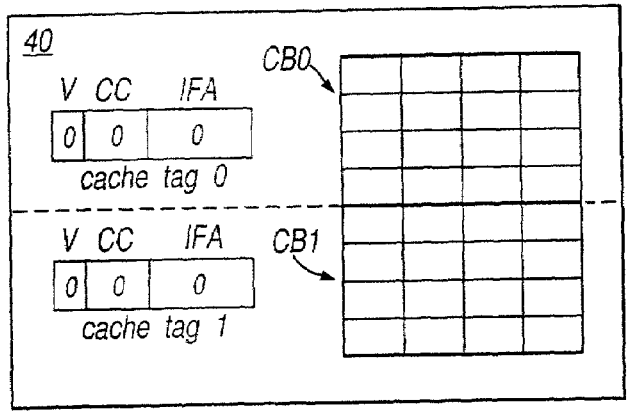
FIGS. 12 to 20 are respective diagrams for illustrating an instruction cache state and an updating unit state at different stages in the FIG. 10 worked example.
Figure 13:
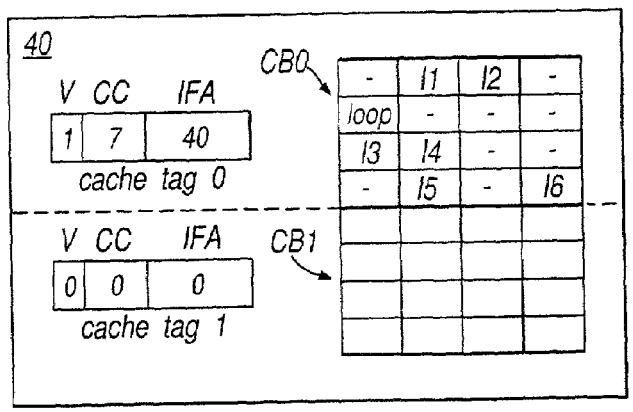

FIG. 12 shows the initial state of the instruction cache 40 and the control registers in the updating unit 148. For the purposes of explanation, it will be assumed that the instruction cache is very small, having just two cache blocks CB0 and CB1. Associated with each cache block is a cache tag CT0 or CT1. Each cache tag CT has the V, CC and IBA fields as described previously with reference to FIG. 7.

In the initial state shown in FIG. 12, i.e. prior to execution of the program portion shown in FIG. 11, both cache blocks CB0 and CB1 are not in use and the V-field of the cache tag associated with each cache block is set to 0. The PC register 50 points to the address 1ffc of the instruction that immediately precedes the FIG. 11 program portion.

When the PC register is incremented to reach 2000 the FIG. 11 program portion is entered. In this initial state, as shown in FIG. 12, the VPC register 52 is blank. Accordingly, the instruction fetching unit 46 issues the LOAD signal to the cache loading unit 42 which initiates a cache loading operation to load VCS1 into the cache 40. The cache loading unit 42 outputs as the value EVPC the VPC value stored in the first word of the section VCS1. This is needed to initialise the VPC register 52.

Once the VPC register is initialised, the cache block which will be used to store the decompressed instructions of the section VCS1 is reserved.

For the purposes of explanation the VPC values (imaginary addresses) shown in FIG. 11 and used in this example specify the imaginary addresses to a precision of one byte. However, it will be understood that, as each processor packet in this example is 16 bytes (4 instructions each of 4 bytes), to identify a processor packet the 4 least significant bits (lsbs) of the VPC value are not required. Accordingly, in practice the VPC register 52 may not have its 4 lsbs implemented. Also, each cache block contains 64 bytes (4 processor packets per block) and so to provide an imaginary block address IBA the 6 lsbs of the VPC value are not required. Accordingly, only the higher-order bits of the VPC value down to (and including) the $7^{th}$ lsb are needed to provide the IBA corresponding to the VPC value. Thus, the IBA corresponding to the VPC value 1000 is 40 (also in hexadecimal notation).

The IBA value is mapped to an unique one of the cache blocks based on a predetermined bit field of the VPC value. In this example, where there are only two cache blocks, the bit field comprises a single bit, which is the $7^{th}$ lsb of the VPC value. This bit provides the INDEX value used to address a cache tag. When INDEX=0 (even-numbered IBA values) cache tag CT0 is addressed, and when INDEX=1 (odd-numbered IBA values) cache tag CT1 is addressed.

In this case, with IBA=40, INDEX=0 and cache tag CT0 is addressed. Its V-field is set to 1 and its IBA field is set to 40, so as to reserve cache block CB0 for the instructions of VCS1. The cache loading unit 42 then reads the instructions I1 to I6 and the "loop" instruction contained in VCS1 from addresses 2008 to 2020, decompresses them using the decompression key KEY1 stored at address 2004, and stores the decompressed instructions (including NOP instructions as necessary) in the reserved cache block CB0 at imaginary address 1000 to 103f. The CC value (7), representing the number of non-NOP instructions in the cache block just loaded, is output by the cache loading unit 42 and stored in the CC field of the cache tag CT0. Thus, the compressed section VCS1 located at address 2000 has been loaded into the cache block CB0 at imaginary address 1000.

Now that the cache loading operation is complete the instruction fetching unit issues the FETCH instruction to fetch a processor packet from the imaginary address 1000 pointed to by the VPC register 50. In this case, as the imaginary address corresponds to an IBA of 40, there is cache hit, and, as a result, the CC register 51 in the updating unit 148 is loaded from the CC field in the matching tag CT0 and the processor packet containing the instructions I1 and I2 is read from the cache block CB0 into the instruction register 54. Accordingly, the instructions I1 and I2 are issued to the execution units in parallel.

The instruction fetching unit 46 then issues the UPDATE signal to the updating unit 148 which increments the VPC register to point to the next processor packet at imaginary address 1010.

After the VPC register has been updated to point to address 1010 the instruction fetching unit 46 issues the FETCH signal again. There is again a cache hit and as a result the processor packet PP containing the "loop" instruction is placed in the instruction register 54, so that the loop instruction is issued. This causes the values in the PC and VPC registers 50 and 52 to be copied to the LPC and LVPC registers 150 and 152 respectively. Before being copied into the LVPC register VPC is incremented to point to the first processor packet after the packet containing the "loop" instruction, i.e. the packet at imaginary address 1020 which contains the instructions I3 and I4.

Figure 14:
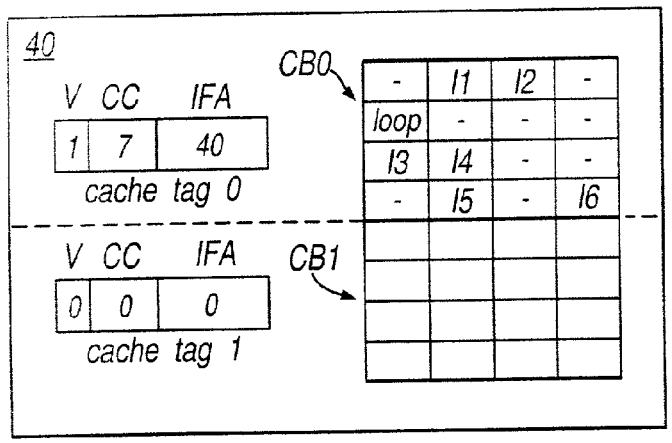
Figure 14:
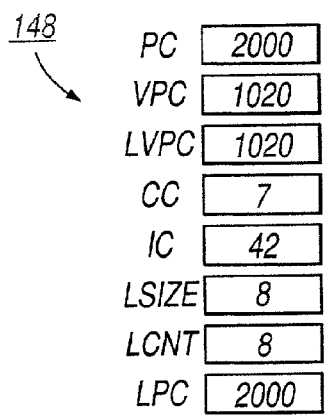

Furthermore, the loop instruction also results in the IC register 154 being loaded with the value held in the register r1 specified in the loop instruction itself, which is 42 in this example. The number of packets in the loop body, 8 in this example, also specified in the loop instruction itself is loaded into the LSIZE register 156 and a copy of LSIZE is also stored in the LCNT register 158. The resulting state of the instruction cache 40 and the registers in the updating unit 148 is shown in FIG. 14.

At the start of the next instruction cycle the instruction fetching unit 46 fetches a processor packet PP from the imaginary address 1020 pointed to by the VPC register 52. There is a cache hit (cache block CB0 again) and the four instructions, including the instructions I3 and I4, of the processor packet at the imaginary address 1020 are issued in parallel to the execution units. The VPC register 52 is then incremented to point to imaginary address 1030 and the LCNT register 158 is decremented by 1.

In the next instruction cycle the processor packet containing the instructions I5 and I6 is issued. VPC is then incremented to the imaginary address 1040 and LCNT is again decremented by 1 to have the value 6.

In the third cycle of the first iteration of the loop, the instruction fetching unit 46 attempts to fetch a processor packet from imaginary address 1040 which is outside the block of decompressed instructions held in cache block CB0. This is detected because the VPC value of 1040 corresponds to an imaginary block address IBA of 41 which is not contained in the IBA field of any valid cache tag. Thus, the instruction cache 40 responds to the FETCH signal by issuing the MISS signal. In response to the MISS signal the instruction fetching unit 46 issues the LOAD signal, in response to which the updating unit 148 updates the PC register 50 to have the value PC+4(CC+2), where CC is the value held in the CC register 51. Thus, PC now points to the first instruction in the compressed section VCS2 in FIG. 11 at real address 2024. After the PC register 50 has been updated in this way, the cache loading operation is performed by the cache loading unit 42. The resulting state of the instruction cache 40 and the registers in the updating unit 148 is shown in FIG. 15.

Figure 15:
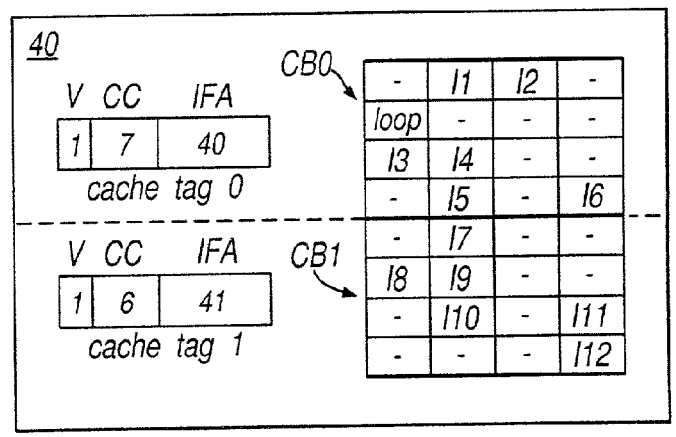
Figure 15:
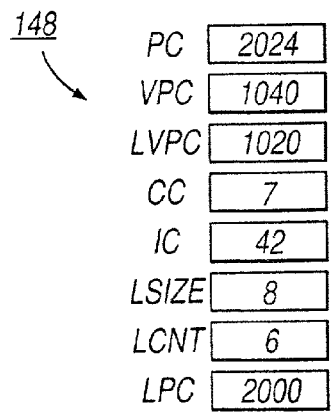

As shown in FIG. 15, the compressed section VCS2 is stored, after decompression, in the cache block CB1 (the IBA of 41 makes INDEX=1, which addresses the cache tag CT1) and the associated cache tag CT1 is initialised to have a V-field of 1, a CC field of 6 (there being 6 non-NOP instructions I7 to I12 in VCS2) and an IBA field of 41.

Execution then continues, with the instruction fetching unit issuing processor packets from the imaginary addresses 1040, 1050, 1060 and 1070 and getting cache hits each time. The LCNT register 158 is reduced to the value 2.

Figure 16:
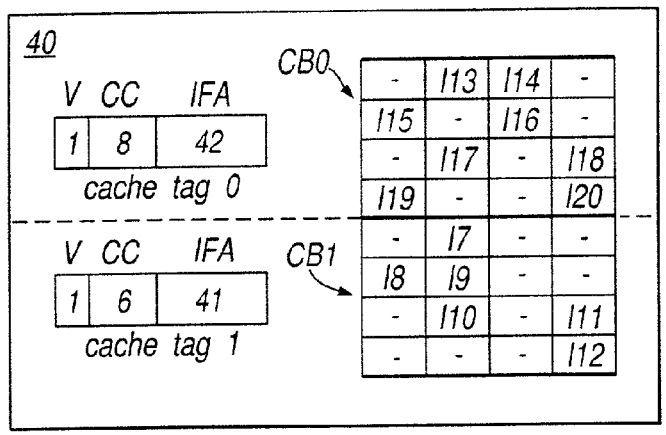

When the VPC register 52 reaches 1080 it again strays outside the range of imaginary addresses currently held in the cache and a cache miss occurs. The IBA corresponding to the imaginary address 1080 is 42. As the cache is a directly-mapped cache, the IBA of 42 (INDEX=0) must be mapped to the cache block CB0, with the result that the first block that was loaded (corresponding to the compressed section VCS1) is overwritten with the decompressed instructions of VCS3. The resulting cache state is shown in FIG. 16. The cache tag CT0 associated with cache block CB0 has a V-field of 1, a CC field of 8 (there being 8 non-NOP instructions I13 to I20 in VCS3), and an IBA field of 42.

Processor packets are then fetched in successive instruction cycles from imaginary addresses 1080, 1090 and 10a0 and are issued to the execution units. Each time a packet is fetched the instruction cache outputs as the value ACC the value 8 of the cache tag CT0 associated with the cache block CB0 from which the packet is fetched.

When the processor packet at 10a0 is fetched, the LCNT register reaches 0, indicating the end of the first iteration of the loop. The IC register 154 is decremented by 1. Because it is still greater than 0 the updating unit reloads the PC register 50 from the LPC register 150, reloads the VPC register 52 from the LVPC register 152, and reloads the LCNT register 158 from the LSIZE register 156. The resulting state is shown in FIG. 17.

Figure 17:
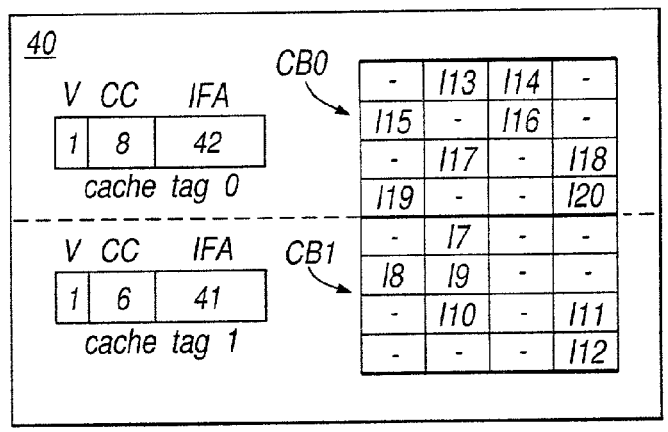

It can be seen from FIG. 17 that when the instruction fetching unit 46 attempts to fetch a packet from imaginary address 1020, which has a corresponding IBA of 40, there will be a cache miss. Accordingly, after receiving the MISS signal from the instruction cache 40 the instruction fetching unit 46 applies the LOAD signal to the cache loading unit 42 with the result that the compressed section VCS1 at real address 2000 (as pointed to by the PC register 50) is decompressed and reloaded into the cache at cache block CB0. Accordingly, the processor packets having imaginary addresses 1000 to 1030 are again held in the cache block CB0 and the processor packets having imaginary addresses 1040 to 1070 are held in the cache block CB1. The resulting state is shown in FIG. 18.

Execution of instructions continues in this way until all 42 iterations of the loop have been completed. At this point, the IC register 154 is decremented to reach 0. At this time the loop terminates and the instruction fetching unit 46 continues issuing instructions from the processor packet after the last loop-body instruction, i.e. the processor packet containing the instructions I19 and I20 at imaginary address 10b0.

Figure 18:
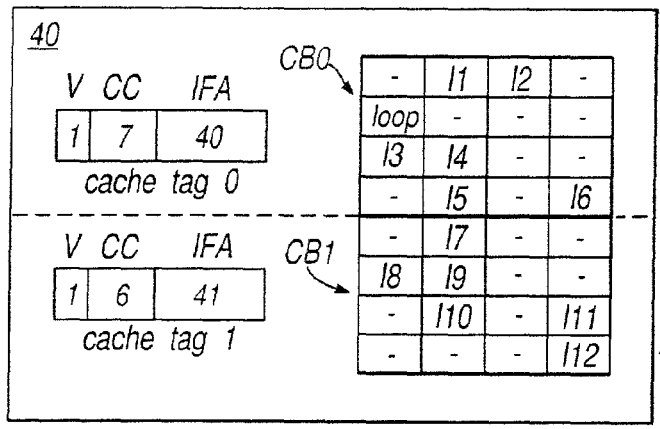

Referring back to the state shown in FIG. 18, it will be assumed that immediately after the processor packet having imaginary address 1020 is issued in the second iteration an interrupt occurs. This interrupt causes the operating system to swap out the current process and begin executing a different process. This may disturb the contents of the cache blocks so that on return to the original process there is no guarantee that the instructions I1 to I12 belonging to the original process and placed there before the interrupt occurred will still be present in the cache blocks.

Accordingly, in the FIG. 8 embodiment when an interrupt occurs the contents of all of the registers of the updating unit 148 are saved by the operating system and are reinstated prior to returning to the original process to resume execution. The content of the instruction cache 40 is not saved.

Figure 19:
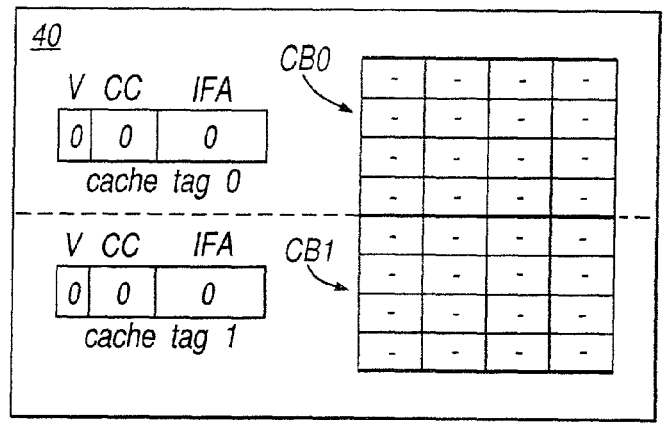

FIG. 19 shows the state of the instruction cache and the registers at the point when execution of the original process is resumed at imaginary address 1030. In this example it is assumed that the contents of both cache blocks (corresponding respectively to VCS1 and VCS2) present prior to the interrupt are evicted by the process invoked by the interrupt. For the sake of clarity, the blocks have been shown to be evicted by simply invalidating the associated cache tags and clearing the blocks. In practice, other blocks would be present rather than the cache being empty, but the net effect is the same.

Figure 20:
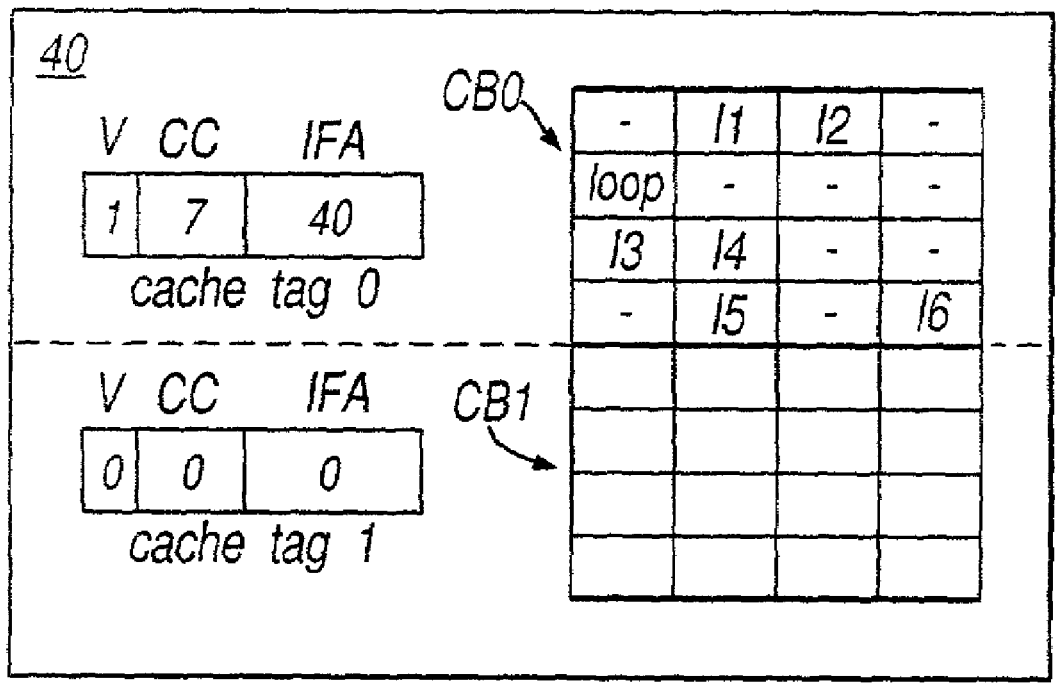

When the instruction fetching unit 46 attempts to fetch a processor packet from imaginary address 1030 a cache miss will occur. The instruction fetching unit 46 will then issue the LOAD signal to the cache loading unit which loads the compressed section VCS1 pointed to by the restored PC register (pointing to the address 2000). This is the required block of instructions and the resulting state is as shown in FIG. 20.

As described above, the FIG. 8 embodiment can cope with random and unexpected evictions from the cache even in the presence of simple control transfer operations associated with hardware-controlled basic loops.

In the embodiments described above, each compressed section VCS includes the imaginary address for the instructions belonging to that section. However, it will be appreciated that it is not necessary to include such imaginary address information in every one of the compressed sections VCS. For example, the imaginary address information could be omitted from all compressed sections except for the first section of a program to be executed. It is necessary to have imaginary address information in the first section to enable the VPC register to the initialised (cf. FIG. 12 above). However, thereafter the VPC register will always be maintained consistent with the PC register, independently of the VPC values held in the second and subsequent compressed sections of the program.

It may still be advantageous to include the imaginary address information in all compressed sections, or at least in certain compressed sections, for error checking purposes. For example, when a compressed section that includes imaginary address information is loaded into the cache the information included in the section can be compared with the VPC value calculated independently by the updating unit, and an error can be flagged if the information from the compressed section is not consistent with the calculated VPC value.

Figure 21:
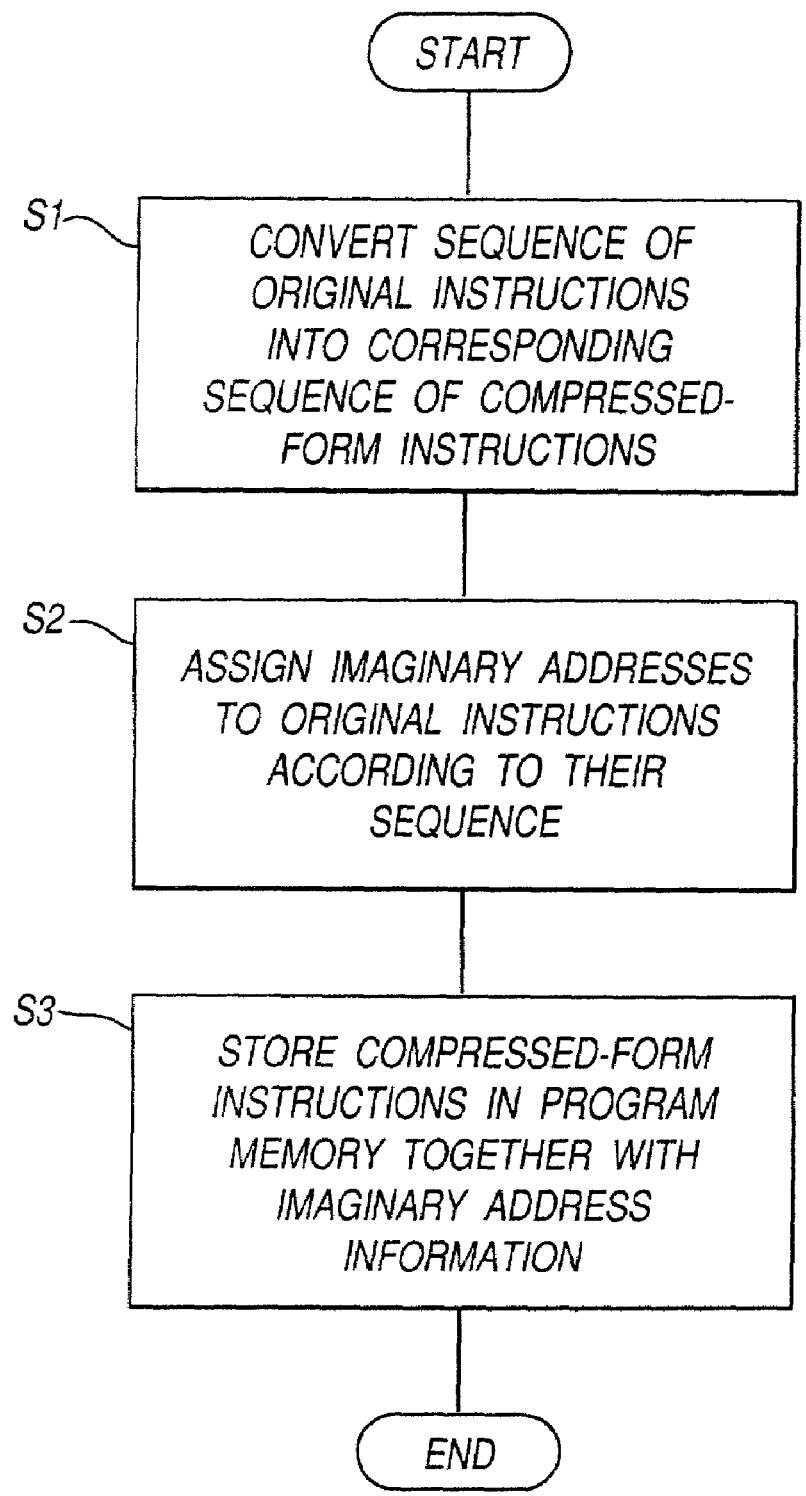
FIG. 21 shows a flowchart for use in explaining a method of compressing instructions according to another aspect of the present invention.

FIG. 21 shows a flowchart for use in explaining how original instructions (non-compressed instructions) of a program are compressed in one embodiment of the present invention. The compression method is carried out, for example, by an assembler and/or linker of the processor.

In a first step S1, a sequence of original instructions of the program to be compressed (e.g. FIG. 10) is converted into a corresponding sequence of compressed-form instructions (e.g. FIG. 11). For example, the instructions may be compressed so as to remove therefrom any explicit NOP instructions.

Then, in a step S2 the original instructions are assigned imaginary addresses according to the sequence in which the instructions appeared prior to compression (again see FIG. 10). The assigned imaginary addresses are imaginary addresses at which the instructions are to be considered to exist when held in decompressed form in the instruction cache of the processor.

Finally, in a step S3, the compressed-form instructions are stored in the program memory together with imaginary address information specifying the imaginary addresses assigned in step S2. In this way, when the compressed-form instructions are decompressed and loaded by the processor into the instruction cache at execution time, the processor can assign the specified imaginary addresses to the decompressed instructions.

When the compressed-form instructions are stored in the program memory in one or more compressed sections, as described hereinbefore in relation to the first and second embodiments, the compressed-form instructions belonging to each section may occupy one block of the processor's instruction cache when decompressed. In this case, each section may contain imaginary address information relating to the instructions of the section. The imaginary address information may specify, for example, the imaginary address at which a first one of the decompressed instructions corresponding to the compressed section is to be considered to exist when the decompressed instructions are held in the processor's instruction cache.

It will be appreciated that, when assigning the imaginary addresses in step S2, the processor's assembler and/or linker have a responsibility to assign entry points in the imaginary address space to each compressed section so that, when decompressed, all sections are disjoint in the imaginary address space. The assembler/linker preferably assigns imaginary entry-points that will not create cache conflicts for blocks of decompressed instructions that are likely to be co-resident in the cache. This is not required for correct operation of the processor, but will improve the ratio of cache hits to cache misses at execution time. The entry points in the imaginary address space must all be aligned on processor packet boundaries.

A compression method embodying the present invention can be implemented by a general-purpose computer operating in accordance with a computer program. This computer program may be carried by any suitable carrier medium such as a storage medium (e.g. floppy disk or CD Rom) or a signal. Such a carrier signal could be a signal downloaded via a communications network such as the Internet. The appended computer program claims are to be interpreted as covering a computer program by itself or in any of the above-mentioned forms.

Although the above description relates, by way of example, to a VLIW processor it will be appreciated that the present invention is applicable to processors other than VLIW processors. A processor embodying the present invention may be included as a processor "core" in a highly-integrated "system-on-a-chip" (SOC) for use in multimedia applications, network routers, video mobile phones, intelligent automobiles, digital television, voice recognition, 3D games, etc.

I claim:

1. A method of compressing a program to be executed by a processor which at execution time reads compressed-form instructions stored in a program memory outside the processor, decompresses the compressed-form instructions and caches them in an instruction cache inside the processor prior to issuing the instructions, the processor having a program counter which points directly to addresses in the program memory from which the compressed-form instructions are to be read, the method comprising:

converting a sequence of original instructions of the program into a corresponding sequence of such compressed-form instructions;

assigning such original instructions imaginary addresses according to said sequence thereof, the assigned imaginary addresses determining at said execution time respective locations in said instruction cache into which the instructions read from the program memory are to be loaded after decompression; and outputting a compressed program comprising the compressed-form instructions together with imaginary address information specifying said assigned imaginary address of at least one said original instruction and storing the compressed program in said program memory so that at said execution time the processor reads both said compressed-form instructions and said imaginary address information from program-memory addresses pointed to directly by the program counter and allocates the assigned imaginary addresses to the decompressed instructions based on said imaginary address information and loads the decompressed instructions into instruction-cache locations determined by the allocated imaginary addresses.

2. A method as claimed in claim 1, wherein the assigned imaginary addresses are selected so that instructions likely to coexist in the instruction cache at execution time will not be mapped to the same cache block.

3. A method as claimed in claim 1, wherein the compressed-form instructions are arranged to be stored in said program memory in one or more compressed sections, the compressed-form instructions belonging to each section occupying one cache block of the processor's instruction cache when decompressed, and at least one compressed section also containing imaginary address information relating to the instructions of that section.

4. A method as claimed in claim 3, wherein said imaginary address information specifies the imaginary address at which a first one of the decompressed instructions corresponding to said at least one compressed section is to be considered to exist when the decompressed instructions are held in said instruction cache.

5. A method as claimed in claim 3, wherein said imaginary address information is contained in only a first one of said compressed sections to be loaded.

6. A method as claimed in claim 3, wherein each said compressed section contains imaginary address information relating to the instructions belonging to the section concerned.

7. A method as claimed in claim 3, wherein the or each said compressed section further contains a decompression key for use by the processor to carry out the decompression of the instructions belonging to said section.

8. A method as claimed in claim 7, wherein said sequence of original instructions of the program comprises preselected instructions that are not stored explicitly in any said compressed section, and the decompression key of the or each said compressed section identifies the positions at which said preselected instructions exist are to appear in a decompressed sequence of instructions corresponding to the section.

9. A method as claimed in claim 8, wherein said preselected instructions are "no operation" instructions.

10. A computer-readable storage medium storing a computer program which carries out a method of compressing a processor program to be executed by a processor which at execution time reads compressed-form instructions stored in a program memory outside the processor and caches the decompressed instructions in an instruction cache within the processor prior to issuing them, the processor having a program counter which points directly to addresses in the program memory from which the compressed-form instructions are to be read, the computer program comprising;
- a converting portion which converts a sequence of original instructions of the processor program into a corresponding sequence of such compressed-form instructions;
- an assigning portion which assigns such original instructions imaginary addresses according to said sequence thereof, the assigned imaginary addresses determining at said execution time respective locations in said instruction cache into which the instructions read from the program memory are to be loaded after decompression; and
- an outputting portion which outputs a compressed program comprising the compressed-form instructions together with imaginary address information specifying said assigned imaginary address of at least one said original instruction and storing the compressed program in said program memory so that at said execution time the processor reads both said compressed-form instructions and said imaginary address information from program-memory addresses pointed to directly by the program counter and allocates the assigned imaginary addresses to the instructions based on said imaginary address information and loads the decompressed instructions into instruction-cache locations determined by the allocated imaginary addresses.

11. A processor, for executing instructions of a program stored in compressed form in a program memory, each said compressed-form instruction having an imaginary address at which the instruction is considered to exist when held in decompressed form within the processor, and the program memory also storing imaginary address information from which the imaginary addresses assigned to the compressed-form instructions is derivable, said processor comprising:
- a program counter which points directly to addresses in said program memory at which said compressed-form instructions and said imaginary address information are stored;
- an instruction cache, having a plurality of cache blocks, each for storing one or more instructions of said program in decompressed form;
- an imaginary address deriving unit operable to read the imaginary address information from a program-memory address pointed to directly by the program counter and to derive therefrom the imaginary address of at least a first one of the compressed-form instructions in said program;
- a cache loading unit, comprising a decompression section, operable to perform a cache loading operation in which one or more compressed-form instructions are read from program-memory addresses pointed to directly by the program counter and are decompressed and stored in one of said cache blocks of the instruction cache, which cache block is determined by the imaginary addresses of said one or more compressed-form instructions being read from said position in the program memory;
- a cache pointer which identifies a location in said instruction cache of an instruction to be fetched for execution;
- an instruction fetching unit which fetches an instruction to be executed from the location identified by the cache pointer and which, when a cache miss occurs because the instruction to be fetched is not present in the instruction cache, causes the cache loading unit to perform said cache loading operation; and
- an updating unit which updates the program counter and cache pointer in response to the fetching of instructions so as to ensure that said program counter is maintained consistently pointing directly to the address in said program memory at which the instruction to be fetched from the instruction cache is stored in compressed form.

12. A processor as claimed in claim 11, wherein:
- the compressed-form instructions are stored in the program memory in one or more compressed sections, the compressed-form instructions belonging to each section occupying one of said cache blocks when decompressed, and at least one section also contains imaginary address information relating to the instructions belonging to the section; and
- said cache loading unit is operable, in said cache loading operation, to decompress and load into one of said cache blocks one such compressed section stored at the position in the program memory identified by the program counter.

13. A processor as claimed in claim 12, wherein said imaginary address information of said at least one section specifies the imaginary address at which a first one of the decompressed instructions corresponding to the compressed section is considered to exist when the decompressed instructions are held in one of the cache blocks.

14. A processor as claimed in claim 12, wherein said imaginary address information is contained in only a first one of said compressed sections to be loaded.

15. A processor as claimed in claim 12, wherein each said compressed section contains imaginary address information relating to the instructions belonging to the section concerned.

16. A computer-readable storage medium storing a compressed program, said compressed program being adapted to be stored in a program memory of a processor and comprising:
- a sequence of compressed-form instructions derived from a corresponding sequence of original instructions, the compressed-form instructions being decompressed by the processor at execution time and the decompressed instructions being cached in an instruction cache inside the processor prior to issuance; and
- imaginary address information specifying an imaginary address assigned to at least one of said original instructions, said assigned imaginary address determining a location in said instruction cache into which the instruction is to be loaded, the imaginary address information being present together with the compressed-form instructions in the compressed program so that at execution time, when the compressed program is stored in the program memory, the processor reads both said compressed-form instructions and said imaginary address information from program-memory addresses pointed to directly by a program counter of the processor and allocates the decompressed instructions to such imaginary addresses based on said imaginary address information and loads the decompressed instructions into instruction-cache locations determined by the allocated imaginary addresses.

17. A computer-readable storage medium as claimed in claim 16, wherein the assigned imaginary addresses are selected so that instructions likely to coexist in the instruction cache at execution time will not be mapped to the same cache block.

18. A computer-readable storage medium as claimed in claim 16, wherein the compressed-form instructions are arranged to be stored in the said program memory in one or more compressed sections, the compressed-form instructions belonging to each section occupying one cache block of the processor's instruction cache when decompressed, and at least one compressed section also containing imaginary address information relating to the instructions of that section.

19. A computer-readable storage medium as claimed in claim 18, wherein said imaginary address information specifies the imaginary address at which a first one of the decompressed instructions corresponding to said one compressed section is to be considered to exist when the decompressed instructions are held in the same instruction cache.

20. A computer-readable storage medium as claimed in claim 18, wherein said imaginary address information is contained in only a first one of the said compressed sections to be loaded.

21. A computer-readable storage medium as claimed in claim 18, wherein each said compressed section contains imaginary address information relating to the instructions belonging to the section concerned.

22. A computer-readable storage medium as claimed in claim 18, wherein the or each said compressed section further contains a decompression key for use by the processor to carry out the decompression of the instructions belonging to the said section.

23. A computer-readable storage medium as claimed in claim 22, wherein said corresponding sequence of original instructions includes preselected instructions that are not stored explicitly in any said compressed section, and the decompression key of the or each said compressed section identifies the positions at which said preselected instructions exist are to appear in a decompressed sequence of instructions corresponding to the section.

24. A computer-readable storage medium as claimed in claim 23, wherein said preselected instructions are "no operation" instructions.

* * * * *